May 11, 1954  L. A. BELL  2,678,183
GLARE SCREEN FOR MOTOR VEHICLES
Filed May 18, 1951
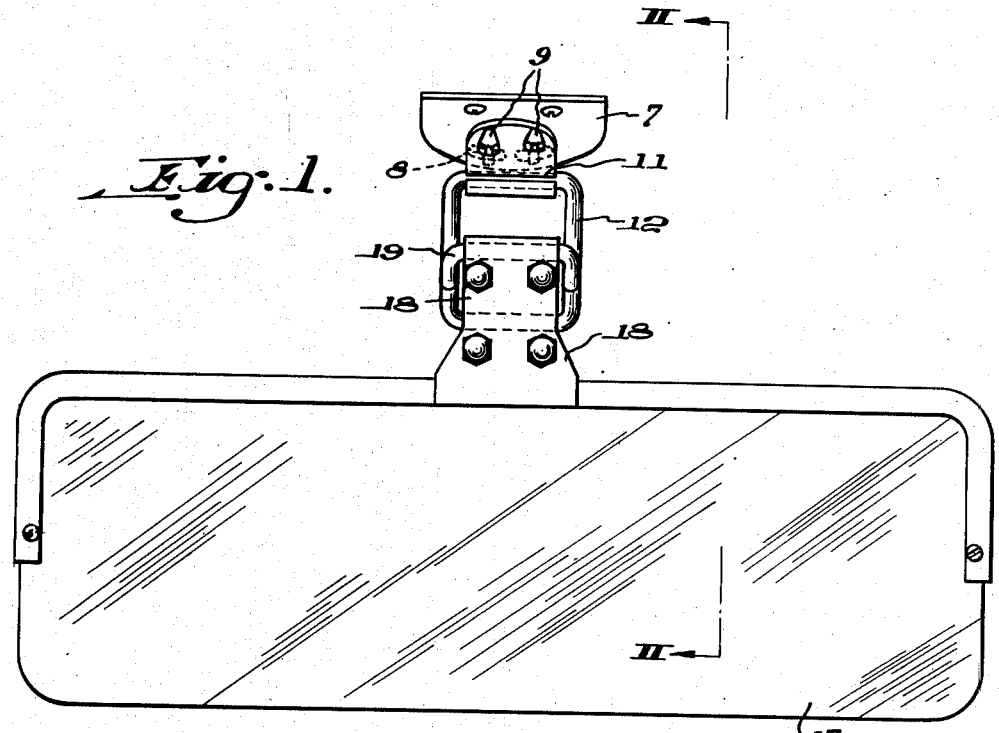
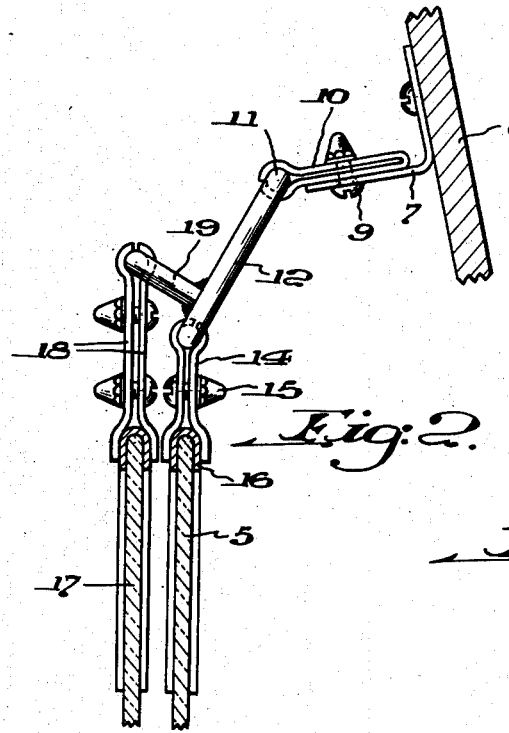
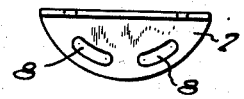
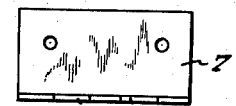
INVENTOR.
LEE ALEXANDER BELL
BY Archworth Martin
his ATTORNEY.

Patented May 11, 1954

2,678,183

UNITED STATES PATENT OFFICE 2,678,183

GLARE SCREEN FOR MOTOR VEHICLES

Lee Alexander Bell, New Kensington, Pa., assignor, by direct and mesne assignments, of eighty-five per cent to Alice A. Bell and Lee Alexander Bell, as tenants by the entirety, and fifteen per cent to Archworth Martin, Pittsburgh, Pa.

Application May 18, 1951, Serial No. 227,083

5 Claims. (Cl. 248—278)

This invention relates to glare screens for automobiles and other vehicles, and comprises an improvement upon the disclosure of my application Serial No. 95,109, filed May 24, 1949.

In mounting glare screens of this type in automobiles of the later models, the brackets for connecting the shields to the vehicle frame above the windshield usually have to be made for right and left hand mounting because of the so-called V or curved shape of the windshield and its supporting frame, in a crosswise direction.

One object of my present invention is to provide a mounting bracket of such form that it can be used toward either the left-hand side or toward the right-hand side of the windshield.

Another object of my invention is to provide a bracket of such form that it will support two glare screens of different degrees of transparency which can be selectively used or used in conjunction with each other against extremely bright lights.

In the accompanying drawing, Figure 1 is a face view of the structure; Fig. 2 is a sectional view taken on the line II—II of Fig. 1; Fig. 3 is a plan view of one of the bracket members of Fig. 2, and Fig. 4 is a face view of this bracket.

The glare screen 5 may be in the form of a single sheet of tinted plate glass or may be of laminated form with one of the glass laminations tinted; or it may comprise two clear glass plates with a tinted adhesive film between them.

The glare shield is connected to a frame member such as the member 6 that is present above the windshield of an automobile. The supporting structure comprises a bracket 7 of sheet metal having a lip with arcuate slots 8 to receive bolts 9 that extend through a clip or clamp 10. This clip is shown as folded upon itself and having its outer ends provided with curved seats 11 that embrace one side of a hanger link 12 of generally rectangular form, the bolts serving to effect frictional connection between the link 12 and the clip, so that the link can remain at various rotatably-adjusted positions. The bolts 9, when loosened, permit adjustment of the clamp 10 angularly with respect to the frame member 6, so as to render the device useable with body frame members that are either curved or angular in generally horizontal directions, thus rendering it suitable for use either at the driver's side of the automobile or at the right-hand side of the vehicle.

A pair of clip plates 14 embrace the lower bar of the hanger link 12 and are frictionally held in engagement therewith by a pair of bolts 15. The lower edges of the clip members 14 are welded or otherwise secured to a channel 16 that supports the glass 5. As described and claimed in my said application, the link 12 is adjustable on its clamp 10 and the clip 14 on the link 12, to adjust the screen 5 to various heights and to various angles.

A second glare screen 17, of somewhat similar tinting as the screen 5, is carried by clamp members 18 that are similar to the members 14 and are frictionally engaged at their upper ends with a bar 19 that is welded to the hanger link 12. For ordinary day-light driving, the screen 17 will be swung up out of the line of vision of the driver and only the screen 5 will be used, although on days when there is no bright sunlight, it too may be swung up out of the line of vision. When exceedingly bright lights are encountered or the vehicle is being driven toward the sun when the sun is low, the screen 17 will be swung down to approximately the position shown in Fig. 2, behind the screen 5.

I claim as my invention:

1. A glare screen support comprising a suspending link of generally rectangular form having upper and lower horizontally-extending bar-like portions, a bracket that frictionally embraces the lower bar-like portion and is pivotally supported thereby, a screen-supporting member carried by the bracket, an attachment bracket having a vertical leg for connection to a vehicle frame and a shelf-like leg provided with a pair of longitudinally-spaced arcuate slots, a clamping device frictionally engaging the said upper bar-like portion and pivotally supporting the same, a pair of bolts extending through the clamping device and the said slots, the bolts being adjustable along the slots to vary the angular position of the clamping device on said shelf-like leg, in a generally horizontal plane.

2. A glare screen support comprising a suspending link of generally rectangular form having upper and lower horizontally-extending bar-like portions, a bracket that frictionally embraces the lower bar-like portion and is pivotally supported thereby, a screen-supporting member carried by the bracket, an attachment bracket having a vertical leg for connection to a vehicle frame and a shelf-like leg provided with a pair of longitudinally-spaced arcuate slots, a clamping plate frictionally engaging the said upper bar-like portion and pivotally supporting the same, a pair of bolts extending through the clamping plate and the said slots, the bolts being adjustable along the slots to vary the angular position of the plate on said shelf-like leg, in a generally horizontal plane, and a bar-like member carried by the sides of the link at points between the upper and lower bars, and serving as a frictionally engageable support for a second screen-supporting bracket.

3. A glare screen support comprising a suspending link having upper and lower horizontally-extending bar-like portions, a bracket that frictionally embraces the lower bar-like portion and is pivotally supported thereby, a screen-supporting member carried by the bracket, an attachment bracket having a vertical leg for connection to a vehicle frame and a shelf-like leg provided with a pair of longitudinally-spaced arcuate slots, a clamping plate folded upon itself and having curved seats in its free edges, frictionally embracing the said upper bar-like portion and pivotally supporting the same, a pair of bolts extending through the clamping plate and the said slots and serving to hold the clamping plate in embracing relation to the upper bar-like portion of the bracket, the bolts being adjustable along the slots to vary the angular position of the plate on said shelf-like leg, in a generally horizontal plane.

4. A glare screen support comprising a suspending link having upper and lower horizontally-extending bar-like portions, a bracket that frictionally embraces the lower bar-like portion and is pivotally supported thereby, a screen-supporting member carried by the bracket, an attachment bracket having a vertical leg for connection to a vehicle frame and a shelf-like leg that is convexly curved along one edge and is provided with a pair of arcuate slots adjacent to said edge and curved parallel thereto, a clamping device frictionally engaging the said upper bar-like portion and pivotally supporting the same, a pair of bolts extending through the clamping device and the said slots, the bolts being adjustable along the slots to vary the angular position of the device on said shelf-like leg, in a generally horizontal plane.

5. A glare screen support comprising a suspending link having upper and lower horizontally-extending bar-like portions, a bracket that frictionally embraces the lower bar-like portion and is pivotally supported thereby, a screen-supporting member carried by the bracket, an attachment bracket having a vertical leg for connection to a vehicle frame and a shelf-like leg that projects backwardly therefrom and is convexly curved along its rear edge and is provided with a pair of arcuate slots adjacent to said edge and curved parallel thereto, a clamping plate folded upon itself and having curved seats in its free edges and beyond the outer edge of said shelf, for frictionally embracing the said upper-bar-like portion and pivotally supporting the same, a pair of bolts extending through the clamping plate and the said slots and serving to hold the clamping plate in embracing relation to the upper bar-like portion of the bracket, the bolts being adjustable along the slots to vary the angular position of the plate on said shelf-like leg, in generally horizontal directions.

References Cited in the file of this patent

UNITED STATES PATENTS

| Number | Name | Date |
|---|---|---|
| 1,522,079 | Read | Jan. 6, 1925 |
| 1,745,695 | Hunter | Feb. 4, 1930 |
| 1,844,289 | Littlejohn | Feb. 9, 1932 |
| 2,220,429 | Soderberg | Nov. 5, 1940 |
| 2,519,222 | Brooks | Aug. 15, 1950 |

FOREIGN PATENTS

| Number | Country | Date |
|---|---|---|
| 402,700 | Great Britain | Dec. 7, 1933 |